Feb. 20, 1945. D. G. C. LUCK 2,369,788
RATE OF CLIMB INDICATOR
Filed May 30, 1942
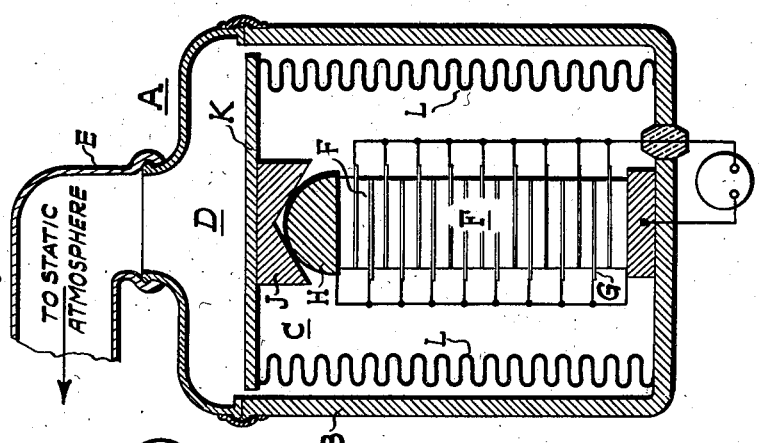
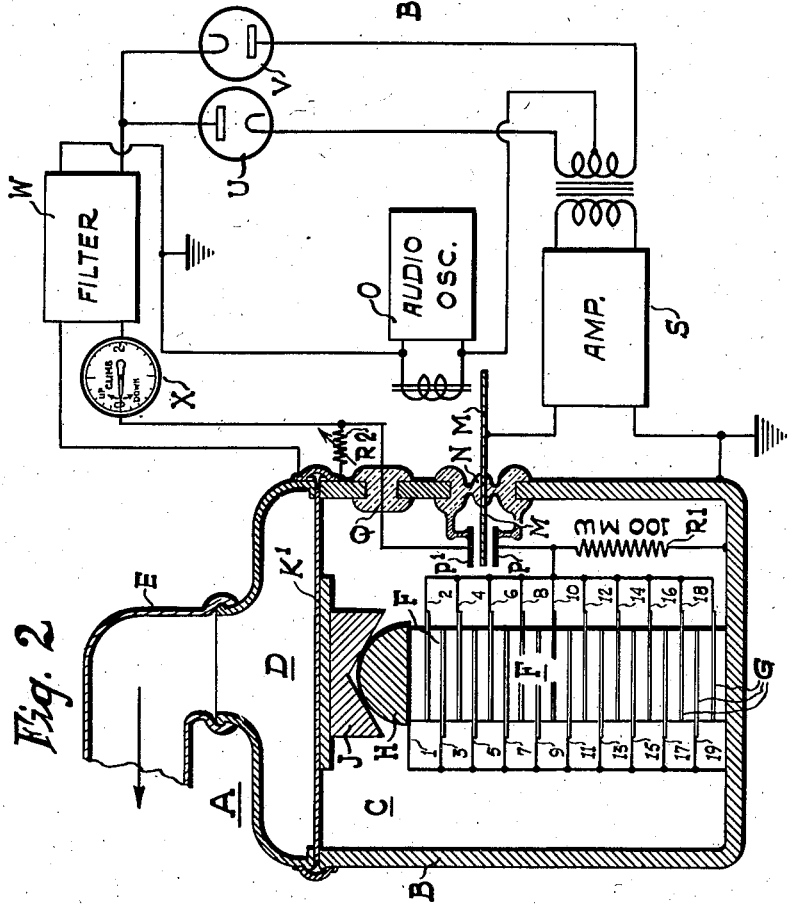
Inventor
DAVID G.C. LUCK
By
C.D. Tuska
Attorney Patented Feb. 20, 1945

2,369,788

UNITED STATES PATENT OFFICE 2,369,788

RATE OF CLIMB INDICATOR

David G. C. Luck, Merchantville, N. J., assignor to Radio Corporation of America, a corporation of Delaware Application May 30, 1942, Serial No. 445,247

2 Claims. (Cl. 73—179)

This invention relates to an improved method and means for ascertaining the rate of climb and rate of descent of an aircraft.

The vertical speed of aircraft is now measured by pressure difference between the free atmosphere and a closed vessel connected to the atmosphere by a slow leak, that is to say by difference between atmospheric pressure now and atmospheric pressure a while ago. (As to this, see, by way of example, U. S. Patent 2,214,181.) The physical property which provides the indication in such prior art instruments is the viscosity of air and this comprises an inherently undesirable defining property because of its sensitivity to various influences. Further, the indications take several seconds to reach their final values after changes in vertical speed. This comprises a serious annoyance in normal instrument flight in which throttle control is done according to vertical speed. Lag in indications, if not compensated for by the pilot, results in over-control and consequent rough flight.

Accordingly, the principal object of the present invention is to provide an improved method and means for ascertaining the rate of climb and rate of descent of an aircraft, and one which obviates the foregoing and other less apparent disadvantages inherent in present day methods and means for indicating vertical speed.

The foregoing and related objects are achieved in accordance with the invention by utilizing the piezoelectric properties peculiar to quartz, tourmaline, Rochelle salts or similar substances to produce a current corresponding to the time rate of change in altitude of the aircraft and by utilizing said current as a measure of the rate of climb or descent of said aircraft.

It is known that a charge is developed on certain faces of a piezoelectric crystal when it is subjected to a compression force applied in certain directions, and that the said charge is proportional to the intensity of said force. Current being defined as rate of change of charge, a steadily varying force applied to such a crystal will develop charge thereon at a steady rate and as a result a steady current directly proportional to the rate of change of force will flow in an external circuit connected thereto. Similarly, if the force applied to the crystal is of fluctuating intensity the crystal will generate a correspondingly fluctuating piezoelectric current.

In carrying the present invention into effect a pile of piezoelectric crystals is subject to a compression force corresponding to the barometric pressure and produces, preferably in a resistive external circuit, a current which is directly proportional to the vertical speed of the aircraft.

A vertical speed of 2000 feet per minute corresponds, at sea level, to a pressure changing at about 1 lb. per square inch per minute, or $\frac{1}{60}$ lb. per square inch per second. A rate of climb indicator should give a perceptible indication for a vertical speed of 10 feet per minute, i. e., a pressure changing at $\frac{1}{6000}$ lb. per square inch per second. By proper design of the pressure sensitive unit an equivalent area of 600 square inches is easily obtained in a compact unit, so that a perceptible indication is required for a force rate of change of $\frac{1}{10}$ lb. per second on the piezoelectric crystals. With X-cut quartz plates, having a piezoelectric coefficient of 10 micromicrocoulombs per pound, this force rate (i. e., $\frac{1}{10}$ lb. per second) will produce a charge at a rate of 1 micromicrocoulomb per second, i. e., a current of 1 micromicroampere. By using tourmaline crystals this figure could be increased somewhat and by using Rochelle salt crystals could be increased to about $\frac{1}{100}$ microampere, but only, in the latter case, by sacrificing the extreme stability of calibration characteristic of quartz and tourmaline.

Certain preferred details of construction together with other objects and advantages of the invention will be apparent upon reference to the following specification and to the accompanying drawing wherein Figure 1 is a sectional view of one form of pressure sensitive unit which may be employed in carrying the invention into effect, and Figure 2 is a partly schematic sectional view of a rate of climb indicator constructed in accordance with the principle of the present invention, and incorporating an alternative form of pressure sensitive unit.

In the drawing, wherein like reference characters designate the same or corresponding parts in both figures, A designates generally a pressure sensitive unit comprising an outer casing B containing a hermetically sealed chamber C and an auxiliary chamber D which is connected as by a pneumatic tube E to a conventional static probe head, not shown, but which will be understood to protrude as far as possible from the aircraft into the surrounding air. The hermetically sealed main chamber C may be evacuated or it may be provided with a filling of a dry gas and contains a pile of piezoelectric crystal elements F which are connected in electrically parallel relation by a number of oppositely extending alternate (odd numbered) and intermediate (even numbered) electrodes G interposed between the separate crystal elements. The crystal pile F in both of the illustrated embodiments of the invention is capped by a metal hemisphere H and by a thrust member J having a conical seat on its under side and a flat top which bears against the inner surface of the top wall K of the chamber C. In the embodiment of the invention shown in Fig. 2, this top wall is comprised, in whole or in part, of a thin metal diaphragm K' which will flex when subjected to variations in the pressure of the ambient and thereby vary the intensity of the compression force applied to the crystal pile through the pressure transfer member H and J. In the pressure sensitive unit of Fig. 1, the same result is achieved by mounting the crystal pile F within a bellows L which, like the diaphragm K' of Fig. 2, is sensitive to the variations in atmospheric pressure normally encountered in the flight of an aircraft.

The number of crystal elements in the pile F depends upon the particular piezoelectric substance of which the said elements are constituted and upon the area of their electrode faces. Assuming the crystals to be X-cut quartz blanks one inch square, approximately 600 crystals would be required to ensure the previously mentioned desired degree of sensitivity. Since the crystals are not oscillating crystals they may comprise inexpensive, unfinished, relatively thin (say, 0.020 inch thick) quartz blanks.

As indicated in Fig. 1 even when quartz, which is the least sensitive of the common piezoelectric substances, is employed the current generated by the crystal pile F could be measured directly as by an extremely sensitive and appropriately calibrated galvanometer L connected between the alternate and intermediate electrodes of the said pile. Such a measuring instrument, however, cannot conveniently be employed on an airplane and it is accordingly preferable to apply the output of the crystal pile F to a resistor R1 (Fig. 2) of the order of 100 megohms to obtain a voltage suitable for amplification. Such a voltage would be of the order of at least 100 microvolts if quartz crystals are employed or one volt for a similar pile of Rochelle salt crystals. The latter voltage (i. e., one volt) could be readily measured by a vacuum tube voltmeter (not shown), especially of the inverse feed back type, but is too variable with temperature for best results.

In the case of a quartz pile, the time constant can easily be reduced to 20 milliseconds with a 100 megohm load (R1) so that indications besides being highly reliable, will be sensibly instantaneous. As will hereinafter more fully appear the small direct voltages (e. g. 100 microvolts) derived from the resistor R1 may be measured by comparison with an adjustable direct reference voltage by means of a capacitive alternator and an amplifier. If the reference adjustment is made by rectified amplifier output, the system may be made automatic and direct indicating as shown in Fig. 2.

It will be observed upon inspection of Fig. 2 that the resistor R1 is mounted within the hermetically sealed chamber C which, as previously set forth, is either evacuated or contains a dry gas filling. This ensures the degree of constancy in overall resistance which is essential to accurate calibration. The value of the resistor R1 is preferably kept down to approximately 100 megohms to make it easy to obtain the low electrical time constant necessary for rapid indications. The extreme stiffness of the quartz pile assures a very low time constant.

A vibrating metallic reed M extends through a flexible insulating bushing N in the wall of the outer casing B and is driven mechanically by a suitable external oscillator O. Within the housing and mounted in symmetrical relation to the reed M are two insulated capacitor plates P and P'. The plate P is connected to the crystal pile F and to its shunt resistor R1. The high impedance, weak current, circuit of the crystal pile comprises only the pile F itself, the shunt resistor R and the capacitor plate P. An insulated connection Q to the other plate P' is lead out through the wall of the housing B. When the two capacitor plates P and P' are at different potentials, the potential of the reed M will fluctuate when it is set into vibration by the oscillator O. If the potential of the second or balancing plate P' is adjusted to equal that of the plate P which is connected to the crystal pile, vibration of the reed M will not affect the reed potential. When the vibrating reed M is connected to the high impedance input of a high gain vacuum tube amplifier S and the balancing plate potential is varied, the amplifier output will fall to zero as the variable voltage is made equal to that produced by the flow of the crystal-generated current through the 100 megohm resistor R1. Thus, the vibrating reed M acts as a converter, giving an alternating voltage output which can easily be amplified and which is proportional to the difference of the D.-C. voltages of the two capacitor plates P and P'.

The balancing-plate voltage may be produced by passing a current through a variable resistor R2 of a low value (say, 100 ohms) to the grounded casing B of the unit and by connecting the plate P' to the high side of the said resistor. As a rate of climb of 10 feet per minute is to be indicated and the crystal pile F is designed to develop charge at a rate of 1 micromicrocoulomb per second under that condition, a voltage of 100 microvolts on the plate P must be indicated; to balance this, a current of 1 microampere must flow in the 100-ohm balancing plate resistor R2. For any accuracy of balance at this rate of climb, the amplifier S must have sufficient gain to give considerable output for a potential difference between the plates P and P' of less than 100 microvolts. This is best achieved by tuning the amplifier S to the vibrating frequency of the reed M. Even for very high performance aircraft, vertical speeds exceeding 5,000 feet per minute are of little concern so the maximum crystal output voltage necessary to be considered is 50 millivolts and the corresponding balancing current is one half a milliampere, which may be positive or negative as the craft travels upward or downward. This current is one which can be indicated by a rugged instrument entirely suitable for use in any type of aircraft.

In order to avoid the need for an operator to listen to the amplifier output and to adjust the balancing current for a minimum strength of output tone (an impractical procedure in an aircraft), balancing may be made to occur automatically. To this end, the output of the amplifier S and the output from the oscillator O which drives the reed M may be combined in proper phase relation in a differential rectifier circuit comprising rectifier tubes U and V. The current in the load impedance in such a circuit has no direct current component in the absence of amplifier output, which implies the absence of a voltage difference between the capacitor plates P and P'. When there is a a voltage difference between the plates P and P', there will be a direct current component in the differential rectifier load and this direct current will flow in either direction as determined by which one of the converter plates P or P' is at the higher voltage and upon what, as a result, is the relative polarity of the amplifier output with respect to the output of the reed driving oscillator O. The differential rectifier output is passed through a smoothing filter W to remove the alternating current components and the remaining direct current component may be passed directly through a suitably calibrated current-indicating meter X and through the resistor R2 which develops the balancing voltage. The described circuit must, of course, be so poled that increasing balancing current will decrease the output of the amplifier S so that the circuit will be self-balancing. Amplifier gain and output capability might, for example, be so chosen that a differential detector output current of 1 milliampere would result from a converter plate difference of 100 microvolts; then, even at a vertical speed of 5,000 feet per minute and a full scale current of one-half milliampere the balance would be good to 5 feet per minute.

Accuracy of indication with this arrangement depends only on constancy of the relations (a) between static pressure of the free air outside the aircraft and the pressure on the diaphragm of the crystal chamber, (b) between air pressure on the diaphragm and force on the crystal pile, (c) between force on the crystal pile and charge developed by the crystals, and (d) between current through the indicating meter and indication given, as well as on the constancy of (e) the 100-megohm and (f) 100-ohm resistors connected between the converter plates and ground. The gain of the amplifier-rectifier-filter system and the vibration amplitude of the reed have negligible effect on the accuracy of indication, unless they fall off so badly as to cause a serious loss of sensitivity of balance. This freedom from dependence of readings on the details of operation of the complex part of the system is the reason for using a self-balancing arrangement, in preference to simply indicating the amplifier output level in the absence of a balancing plate.

Resistor values, the relation between current and indicator reading and that between change of force on the crystal pile and change in the piezoelectric charge generated can easily be made highly accurate and permanent. The relation between changes of air pressure on the diaphragm and changes of force on the pile can also be made very constant; slow changes of force on the pile due to changing temperature can be made to correspond to such low rates of climb as to do no serious harm. Since only changes of piezoelectric charge are measured and the crystal pile is shunted by a relatively low resistance, electrical leakage can easily be kept low enough to do little harm. The most doubtful factor in the operation of the system is the relation between the static free-air barometric pressure and the air pressure in the diaphragm chamber. This is a source of error in all barometric altitude measuring devices and the present invention does not attempt to overcome it. The usual precaution is to seal the measuring chamber from the interior of the aircraft and connect it pneumatically to a static probe head protruding into the surrounding air as far as possible from the aircraft structure.

From the foregoing it is apparent that the present invention provides a novel and reliable rate of climb indicator, and one characterized by its accuracy and rapid action.

What is claimed is:

1. Method of ascertaining the rate of climb of an aircraft, said method comprising piezoelectrically generating a current corresponding to the time rate of change of barometric pressure with altitude of said aircraft, converting said current into a proportional D.-C. voltage, generating an auxiliary direct current, deriving from said auxiliary current a proportional second D.-C. voltage, converting the difference between said D.-C. voltages into an alternating voltage, amplifying said alternating voltage, applying said amplified alternating voltage to regulate said auxiliary current to minimize the difference between said D.-C. voltages, whereby said auxiliary current corresponds in intensity to said first mentioned D.-C. voltage, and utilizing said auxiliary direct current as a measure of the rate of climb of said aircraft.

2. A rate of climb indicator for aircraft comprising, piezoelectric means for generating a current corresponding to the time rate of change of barometric pressure with altitude of said aircraft, means for converting said current into a proportional D.-C. voltage, an auxiliary direct current source, means for deriving from said auxiliary current a proportional second D.-C. voltage, means for converting any difference between said D.-C. voltages into an alternating voltage, means for amplifying said alternating voltage, means for applying said amplified alternating voltage to regulate said auxiliary current to minimize the said difference between said D.-C. voltages whereby said auxiliary current corresponds in intensity to said first D.-C. voltage, and means for indicating said auxiliary direct current as a measure of the rate of climb of said aircraft.

DAVID G. C. LUCK.